United States Patent [19]

Short

[11] 4,222,804
[45] Sep. 16, 1980

[54] METHOD OF JOINING TOGETHER THE SECTIONS OF LARGE-DIAMETER FIBERGLASS-REINFORCED TANKS

[75] Inventor: Robert J. Short, Laguna Beach, Calif.

[73] Assignee: Tankinetics, Inc., Westminster, Calif.

[21] Appl. No.: 911,074

[22] Filed: May 31, 1978

[51] Int. Cl.² .................... B32B 31/04; B32B 31/12
[52] U.S. Cl. ................... 156/182; 156/304.2; 156/304.3; 156/305; 220/1 B; 264/262; 264/263
[58] Field of Search ............ 156/182, 304, 305; 264/262, 263; 220/1 B

[56] References Cited

U.S. PATENT DOCUMENTS

| | | | |
|---|---|---|---|
| 333,011 | 12/1885 | Hoeveler | 264/262 |
| 615,149 | 11/1898 | Farley | 285/294 |
| 2,180,695 | 11/1939 | Rembert | 285/114 |
| 2,182,671 | 12/1939 | Lowe et al. | 285/119 |
| 2,313,074 | 3/1943 | Jewell | 285/114 |
| 2,409,865 | 10/1946 | Jewell | 285/113 |
| 2,573,366 | 10/1951 | Scholl | 285/115 |
| 3,095,993 | 7/1963 | Balcom et al. | 220/5 |
| 3,182,110 | 5/1965 | Balcom et al. | 264/263 |
| 3,383,002 | 5/1968 | Fleming et al. | 220/5 |
| 3,847,694 | 11/1974 | Stewing et al. | 156/305 |
| 3,920,268 | 11/1975 | Stewing | 285/21 |
| 3,920,787 | 11/1975 | McDowell et al. | 264/263 |
| 3,956,816 | 5/1976 | Short | 220/1 B |
| 3,989,281 | 11/1976 | Wilde | 285/45 |
| 4,004,706 | 1/1977 | Guldenfels et al. | 220/3 |

Primary Examiner—James J. Bell
Attorney, Agent, or Firm—Gausewitz, Carr & Rothenberg

[57] ABSTRACT

The time required for the erection of large-diameter fiberglass-reinforced tanks is reduced greatly, and tank quality much improved, by providing fiberglass-reinforced joint rings exteriorly adjacent the abutted ends of the tank sections, bonding and sealing the joint-ring edges to the tank section walls, and introducing large amounts of thermosetting bonding resin into the resulting large annuluses. Fiberglass-reinforced joint means are also bonded to the section ends interiorly thereof. This is accomplished by mounting corrosion-barrier joint rings interiorly adjacent the abutted ends in such manner as to create annuluses, and injecting bonding and corrosion-prevention resin into such annuluses. Each exterior joint ring is first mounted on a tank section above the end, then such end is caused to abut an opposed end, and then the joint ring is dropped onto stop means prior to the above-mentioned bonding-sealing and resin-introduction steps.

19 Claims, 6 Drawing Figures

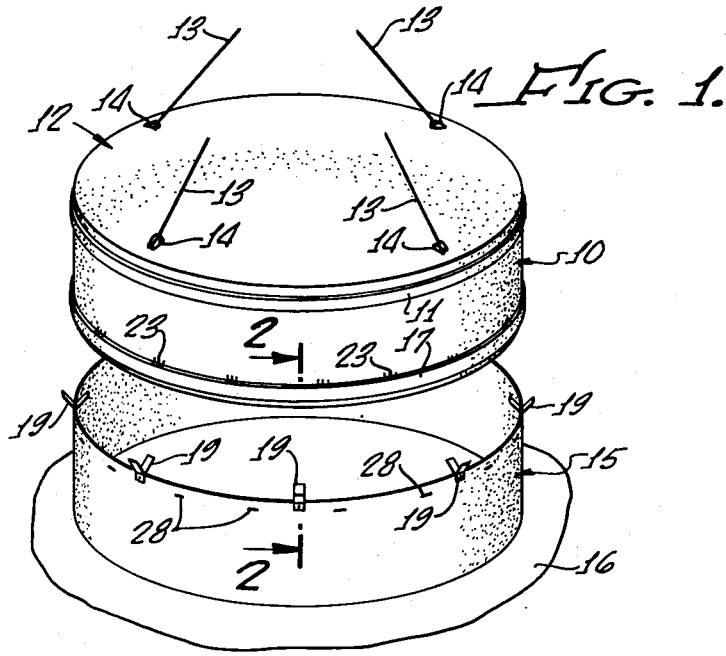
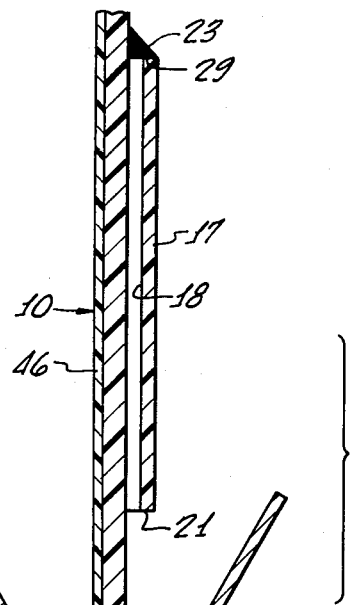
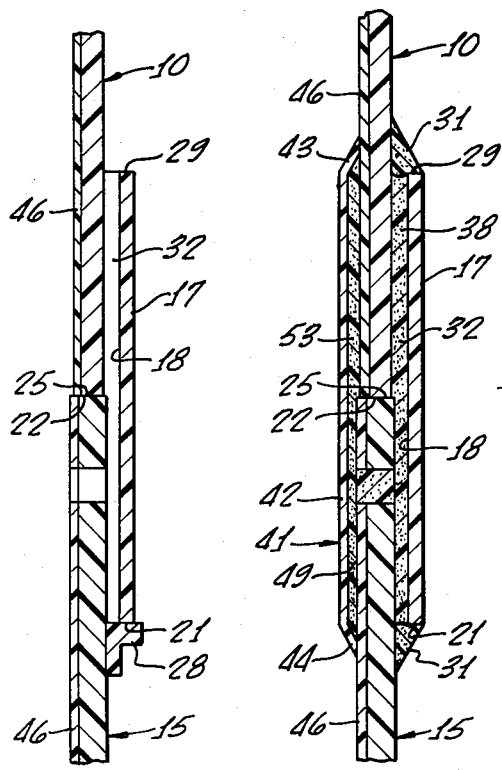
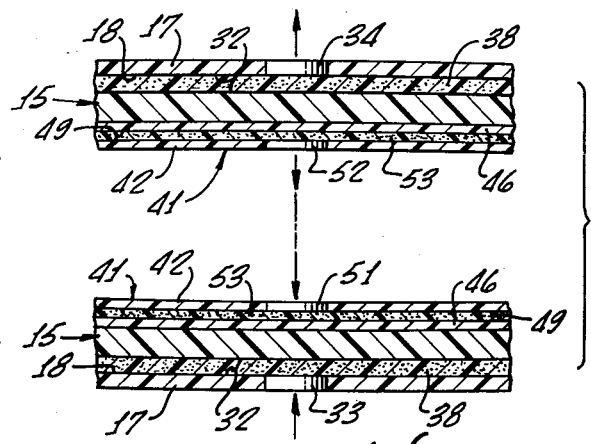
FIG. 1. FIG. 2. FIG. 3. FIG. 6. FIG. 5.

METHOD OF JOINING TOGETHER THE SECTIONS OF LARGE-DIAMETER FIBERGLASS-REINFORCED TANKS

BACKGROUND OF THE INVENTION

1. Field of the Invention

This invention relates to the field of large-diameter fiberglass-reinforced synthetic resin tanks which have diameters in the range of about 8 to about 60 feet and are capable of holding thousands of gallons of corrosive chemicals, etc.

2. Description of Prior Art

In my prior U.S. Pat. No. 3,956,816, there is shown and described a method of oblating, nesting, transporting, and erecting fiberglass-reinforced tank sections, making it practical to erect very large tanks at great distances from a factory where the tank sections were constructed. The joints described in said patent were made entirely by hand lay-up and required much time and labor. In this connection it is emphasized that each joint must absolutely seal the liquid contents of the tank, which contents may be highly corrosive and under very substantial pressure. Furthermore, the joints must create sufficient axial strength and (in some cases) hoop strength at the abutted tank section ends to withstand the stresses created during the erection process and also the stresses caused by the stored liquid in the tank.

When hand lay-up of fiberglass cloth impregnated with synthetic bonding resin is the only means employed to form such joints, factors such as irregularities in the exact shapes and sizes of the sections become relatively unimportant. However, it is emphasized that (as stated) such hand lay-up is a highly laborious operation requiring much skilled labor. To supplant all or part of the hand lay-up method by a method which requires greatly less labor and also improves the quality of the tank, it is necessary to overcome the major problems created by the above-indicated irregularities in shapes and sizes. In this connection it is emphasized that when tank sections are (for example) 40 feet in diameter, it becomes impractical or impossible to achieve perfect abutment, perfect cylindrical shapes, etc., so that irregularities necessarily result.

Referring next to prior art other than applicant's own patent, it has been well known for many decades that joints between the ends of pipe sections, the components of small tanks or containers, etc., may be made by injection of bonding material into annular chambers defined at the joints. However, relative to these small-diameter and substantially rigid elements, there exists none of the major problems which have been overcome by applicant, and there is no suggestion that such problems may be overcome—with surprisingly beneficial results—as has been accomplished by applicant.

SUMMARY OF THE INVENTION

In accordance with the present invention, no hand lay-up is employed on at least one side (the exterior or the interior) of each joint. Instead, an annular chamber is defined adjacent the abutted ends of the tank sections by means including a joint ring, and synthetic bonding resin is introduced into the annular chamber for flow around the tank to complete the joint.

Stated more specifically, each joint means on the exterior of the tank is a cylindrical hoop formed of fiberglass and synthetic resin, such hoop being exteriorly adjacent the section ends. Synthetic resin "putty" is employed to seal and bond the upper and lower edges of the joint hoop to the exterior surfaces of the tank sections. Large amounts of synthetic bonding resin are then introduced into the resulting annulus at at least one point about the circumference of the tank, and a vent hole is provided to permit escape of air.

On the interior of the tank, the joint means comprises a strip of corrosion-resistant fiberglass-reinforced synthetic resin. The edges of the strip are angular flanges which abut against the corrosion barrier layer that is present on the interior surface of each tank section. Synthetic resin, one which is compatible with the corrosion barrier layer, is then introduced into the annulus to thus complete the joint and maintain a highly effective corrosion-prevention construction, one whereby the liquid contained in the tank only contacts a primary laminate instead of a hand lay-up joint.

The method further comprises important steps relative to mounting of at least the exterior joint ring or hoop. Such joint ring is attached to a tank section in spaced relationship above the lower edge thereof and with sufficient radial clearance to insure against binding. The tank section, with the joint ring attached thereto, is then lowered onto another tank section and maintained in alignment by removable guide members. Stop means are provided on the lower tank section below the upper edge thereof, and the abutted ends of the sections are sealed together by means of synthetic resin "putty." Thereafter, the guide members are removed, the means of securing the joint ring to the upper tank section is removed, and the joint ring is allowed to drop onto the stop means. The putty is then employed to create the seals and bonds between the upper and lower joint ring edges and the tank section walls, following which the resin-introduction step is performed as stated above.

BRIEF DESCRIPTION OF THE DRAWINGS

FIG. 1 is an isometric view showing one tank section or module suspended in spaced relationship above another, such one section having mounted at its lower portion a joint ring employed in the practice of the present method;

FIG. 2 is a vertical sectional view on line 2—2 of FIG. 1, but showing the upper tank section adjacent (yet not seated on) the upper edge of the lower section;

FIG. 3 is a vertical sectional view showing the components of FIG. 2 after removal of the guide members and after the joint ring has been dropped onto the stop means;

FIG. 5 is a fragmentary horizontal sectional view corresponding to the "upper" and "lower" portions of the showing of FIG. 4 but illustrating in more realistic relationship the curvature of the tank walls in comparison to the thicknesses of the joint components; and FIG. 6 is a vertical sectional view of a completed joint, including both exterior and interior components.

DETAILED DESCRIPTION OF THE PREFERRED EMBODIMENT

Figure 4:
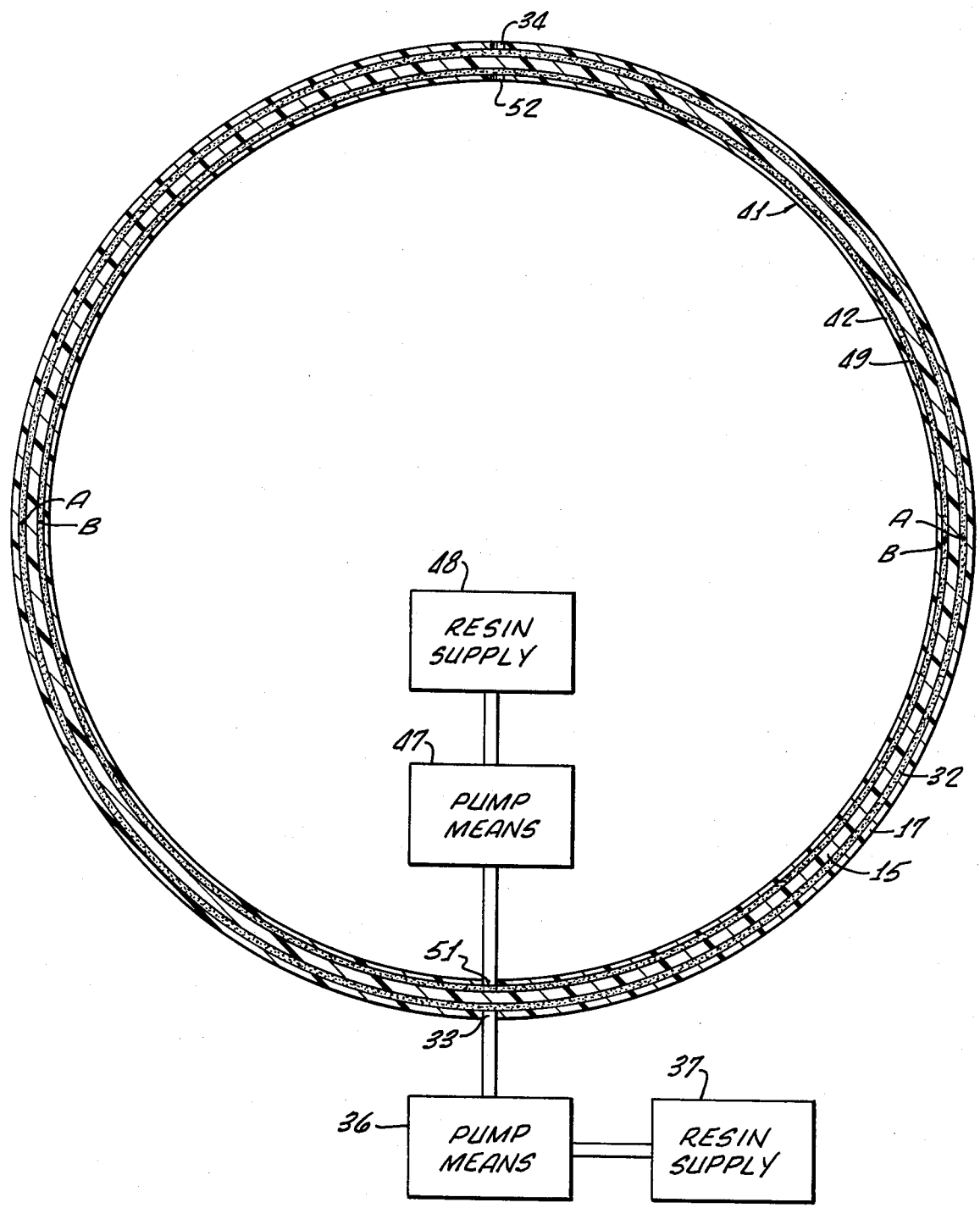
FIG. 4 is a horizontal sectional view at the joint region, the view being necessarily greatly out of proportion in that it shows the wall thicknesses much too large in comparison to the diameter of the tank (it being remembered that the tank is actually about 8 to about 60 feet or more in diameter), such FIG. 4 illustrating the pumping of resin into exterior and interior annuluses and the venting of air from diametrically-opposite regions of the tank.

The above-cited U.S. Pat. No. 3,956,816 is hereby incorporated by reference herein, as though set forth in full.

Referring first to FIG. 1, except as specifically stated herein this corresponds to FIG. 12 of said patent. Thus, an upper section or module 10 has previously been joined at a joint 11 to a top or cover 12, and the joined elements 10, 12 are being suspended by hoist or cable means 13 and lugs 14 over an additional tank section or module 15 which is supported on a concrete pad 16. The various tank sections or modules 10 and 15, etc., are all formed of fiberglass-reinforced synthetic resin such as polyester resin, as are the top 12 and the tank bottom (not shown).

There will next be described the method of forming a greatly improved joint between sections 10 and 15. Although the method is only described relative to one of the joints, it is to be understood that the same method is employed to form the above-indicated joint 11 and each other circumferential joint in the tank.

Referring to FIGS. 1 and 2, there is "tacked" to the exterior surface of section 10 a joint ring 17. Such ring is a continuous hoop having a cylindrical shape, and having an inner diameter which is just sufficiently large to prevent substantial binding during lowering of the joint ring as described below. As one example, the clearance between the inner surface 18 (FIG. 2) of the joint ring and the exterior surface of tank section 10 may be about ⅜ inch where the diameter of section 10 is about 40 feet. It is to be understood that this example is given by way of illustration only, not limitation, and that the clearance may be somewhat larger for larger-diameter tanks and somewhat smaller for smaller-diameter tanks. The clearance (⅜ inch on radius, in the example) takes into account irregularities in the exact shape of the tank sections 10 and 15, which irregularities may result from the fact that the sections are not necessarily perfectly cylindrical especially since they are so large in diameter and are being erected in the field by personnel who need not be highly skilled.

Because of the presence of guide members 19 (described in the cited patent) on the upper portion of the lower tank section 15, the lower edge 21 (FIG. 2) of joint ring 17 is spaced above the lower edge 22 of section 10. The ring 17 is temporarily held in its position spaced above edge 22 as by tack bonds indicated at 23. Such bonds are so made as to uniformly distribute the clearance about the circumference of the tank section, and may be made by means of thermosetting "putty" (namely, a thermosetting synthetic bonding resin having a suitable filler therein which produces a thixotropic putty).

Joint ring 17, and other joint rings employed in performing the method, are so made as to provide the requisite axial and circumferential strengths. They are made of fiberglass-reinforced synthetic bonding resin and may (for example) be wound on a mold as described relative to FIG. 2 of the cited patent. Preferably, the joint ring 17 has substantial numbers of axial as well as circumferential fibers and therefore may usually be substantially thinner than is the wall of the tank section.

It is pointed out that for all joints except the one between the lowermost tank section and the tank bottom (not shown), the joint ring 17 and corresponding joint rings are formed primarily to create axial (vertical) strength. No great hoop strength is required for such joints, since the adjacent tank walls are continuously reinforced by fiberglass and therefore create much hoop strength in and of themselves. Relative to the lowermost of the joints, hoop strength becomes of major importance since the tank bottom (shown at 15 in FIGS. 10 and 13 of the cited patent) is preferably made of two pieces and thus is not continuously reinforced by fiberglass. Thus, for at least the bottom joint, the thickness of the joint ring may be equal to that of the bottom tank section. It is also pointed out that the tank sections or modules become progressively less thick from the bottom section to the top, as shown, due to the different amounts of liquid pressure present in the tank.

Thus, as stated, the first steps of the present method comprise providing the joint ring 17, tacking it onto tank section 10 at some convenient location, and employing hoist means 13, 14 to lift the combination to a position above the next tank section as shown in FIG. 1. The next step in the method comprises lowering the various suspended elements until bottom edge 22 seats on the upper edge 25 of lower section 15. During such lowering, edge 22 is guided by elements 19 so that there will be a butt relationship between edges 22 and 25.

As the next steps in the method, the described putty is employed to seal the continuous circumferential joint between edges 22 and 25, following which the guide means 19 are removed by removing the bolts and nuts 26-27 associated therewith. The bolt holes are also plugged by the putty. Furthermore, either at this time or previously at a separate location, stop means 28 in the form of suitable lugs are (or have previously been) secured to the exterior surface of lower section 15 as by means of the putty.

Sufficient numbers of stop means 28 are provided to effect support of the joint ring 17, being so located as to support the joint ring at a location where it is approximately half above the abutted edges 22, 25 and half therebeneath. Thus, the joint ring is in straddling relationship relative to the abutted ends of the tank sections. Typically, each ring 17 is about one foot high in a tank 40 feet in diameter.

As the next step in the method, the tack bonds 23 are broken to cause joint ring 17 to drop onto stop means 28, as shown in FIG. 3. Thereafter, as shown at the right in FIG. 6, the upper and lower edges 29 and 21 of joint ring 17 are adhesively secured and sealed, by the putty, to the adjacent portions of the exterior surfaces of tank sections 10 and 15, respectively. Stated otherwise, continuous fillet bonds 31 are provided as shown in section at the right of FIG. 6, and these fillet bonds seal the annulus 32 which is defined interiorly of joint ring surface 18 and exteriorly of the tank surfaces.

The bonds and seals 31 are so made that the clearance is substantially uniformly distributed about the circumference of tank sections 10 and 15. To achieve this result, small wedges (not shown) are temporarily mounted in annulus 32 in spaced relationship about the circumference of the tank.

After the putty forming the fillet bonds 31 is cured sufficiently to insure that there will be no leakage out of annulus 32, thermosetting synthetic bonding resin is introduced into such annulus in the manner next described. Referring to FIGS. 4 and 5, the former being necessarily greatly out of proportion in that the tank is vastly larger in diameter (in comparison to wall thickness) than what can be shown in such FIG. 4, injection and vent holes 33 and 34, respectively, are provided through joint ring 17 at diametrically opposite portions thereof. The vent hole 34 is provided adjacent the upper edge of ring 17 so that venting of air may be maximized.

A suitable pump means, represented schematically at 36 in FIG. 4, is then employed to pump a thermosetting synthetic bonding resin (preferably a polyester resin) into annulus 32 from a resin supply indicated schematically at 37. The resin thus pumped enters through intake opening 33 and passes in both directions around the tank through annulus 32. If the rate of introduction is low, the resin seeks its own level in the annulus and then gradually rises. If the rate of injection is sufficiently high, as is preferred, the "front" or leading portions of the two forwardly advancing masses of synthetic resin act as pistons to expel air toward vent hole 34 from which the air vents. As an example, the two moving fronts of resin will reach points "A" (FIG. 4) at substantially the same time, this being approximately half the distance from intake opening 33 to vent opening 34.

The composition of the resin (the type and amount of catalyst) is caused to be such that no substantial setting or curing will occur until the resin passes clear through the annulus 32 to the vent opening 34 and starts to emanate therefrom. At that time, the pump means 36 is stopped and openings 33, 34 are plugged. The result is that substantially the entire annulus is filled with the resin, which resin is indicated at 38. Furthermore, the amount of air entrapment within the annulus is very small.

Thus, with no hand lay-up whatever, there is provided exteriorly of the butt joint between sections 10 and 15 of the tank a very strong joint means having a high degree of strength in the necessary directions (axial and/or hoop), depending upon the arrangement of the fiberglass reinforcing in the joint ring 17.

The amount of resin employed to fill annulus 38 may be great, for example far in excess of 100 pounds for large-diameter tanks. The amount of time required to make the joint is reduced to a small fraction of that required by prior-art hand lay-up methods. Despite this extreme reduction in time, with vastly reduced labor, the quality of the joint is superior to that achieved by the hand lay-up method.

It is possible for the above-described method, relative to the connection of tank modules or sections 10 and 15 to each other, to be performed relative to the inside (interior) surfaces of sections 10 and 15 instead of relative to the outside surfaces thereof. Furthermore, it is possible for the method to be employed on the exterior of the tank (as described) and hand lay-up to be performed on the interior of the tank adjacent the abutted ends of the tank sections. Preferably, however, the described method is employed relative to the outside of the tank and the method next to be described is performed relative to the inside in order to maintain to the greatest possible extent the continuity of the corrosion barrier on the inside.

Before proceeding with a detailed description of the making of the preferred corrosion-barrier joint on the inside of the tank, at each tank joint between sections 10, 15 and others, reference will be made to the difference between "primary laminates" and other laminates. A "primary laminate" is, in the present art, a layer of fiberglass-reinforced synthetic resin which is formed on a mold. The surface which is formed on a mold can, inherently, be smoother (the mold surface being very smooth) than a surface which is not and, being smoother, will have less surface area subject to corrosive attack. Therefore, it is highly desirable that the element exposed to the corrosive liquid within the tank be a primary laminate, and that the mold-formed surface of the primary laminate face inwardly.

Referring particularly to FIG. 6, an interior joint strip 41 is provided and is mounted to the interior surfaces of sections 10, 15 in straddling relationship to the abutted ends 22, 25. Preferably, as shown, the width (vertical dimension) of joint strip 41 is approximately the same as that of the joint ring 17. Strip 41 has a body 42 which is cylindrical in shape after mounting of the strip to the tank, and has upper and lower flanges 43, 44 which project outwardly at an angle (such as, for example, 45 degrees) from the upper and lower edges of the body. Body 42 and its flanges 43 and 44 are formed integrally on a smooth mold in such relationship that those surfaces which face the interior of the tank (to the left as shown in FIG. 6) are the mold-formed surfaces. In other words, the left facing surfaces of elements 42–44, as viewed in FIG. 6, are those which actually engage the mold during the formation of the strip 41.

Joint strip 41 is preferably not a continuous hoop (until it is mounted) but instead is formed into a roll for shipment and then placed in the interior of the tank. The strip is then unrolled and mounted in the position shown in FIG. 6, in straddling relationship to the abutted tank section ends, such mounting being effected by use of polyester resin which is compatible with the corrosion barrier layer 46 formed on the interior surface of each tank section as shown in the various sectional views. The resin not only effects mounting but also continuous sealing of the annulus. The ends of the strip are butted to each other and bonded together by the same resin which is corrosion resistant and compatible with the corrosion barrier layer 46. Each layer 46 is, as described in the cited patent, formed on a mold.

Referring to FIG. 4, the next step in the method comprises employing a pump means 47 and resin supply 48 to pump into the annulus 49, which is defined within the mounted strip 41, a synthetic resin which is the corrosion-resistance equal to that of each corrosion barrier layer 46. This resin is injected through an injection opening 51, and air is vented through a vent opening 52, these being on diametrically opposite sides of the tank as shown in FIGS. 4 and 5. When the rate of pumping is sufficiently great, the resin flows in both directions around the annulus 49, reaching points "B" substantially simultaneously (FIG. 4) and then continuing on to the vent opening. When the resin starts to flow out the vent opening, pumping is stopped and the inlet and vent openings are plugged.

The result is that the annulus 49 is completely filled with resin 53 which is the corrosion-resistance equivalent of each corrosion barrier layer 46. Furthermore, the left-facing surfaces of FIG. 6 form primary-laminate continuations of the barrier layer 46 as described. Tendency toward corrosion is thus minimized, and leakage is rendered substantially impossible.

The exterior and interior portions of the joint between tank sections 10, 15 (and of other tank joints) may be made substantially simultaneously, or the work may be performed on the exterior of the tank at a different time as that performed relative to the interior. In any event, there results a very strong, corrosion resistant joint having the major benefits of minimum labor and time necessary for formation, maximum resistance to corrosion, high strength, etc.

As shown and described at length in the cited patent, each tank section is sufficiently large in diameter, and sufficiently thin walled, to be greatly oblated and nested for shipment from the factory to the erection site. The same is true of each joint ring 17. Thus, each ring 17 is greatly oblated and shipped—along with the tank sections, and tank top and bottom, from the factory to the job site.

The words "cylinder" and "cylindrical" are used in their common, conventional senses to denote right circular cylinders. The word "side" in the appended claims does not refer to any region above or below a joint in a vertical tank. Instead, the word "side" relates to inside versus outside. Thus, when it is stated that some element is on one side of the abutted tank section ends, it denotes that such element is either on the exterior or interior of the tank.

The foregoing detailed description is to be clearly understood as given by way of illustration and example only, the spirit and scope of this invention being limited solely by the appended claims.

I claim:

1. A method of making a butt joint in a large-diameter fiberglass-reinforced cylindrical tank, said method comprising:
   (a) providing two cylindrical tank sections each having substantially the same large diameter and each formed of fiberglass-reinforced synthetic resin, the diameter of each of said sections being sufficiently great, and the wall thickness sufficiently small, that the sections may be greatly oblated for shipment prior to making of the butt joint, said tank sections having diameters in the range of about 8 feet to about 60 feet,
   (b) disposing said sections in axial alignment, with the end of one of said sections adjacent the end of the other,
   (c) disposing a joint element radially adjacent both of said ends in straddling relationship thereto,
   (d) causing said joint element, and the surfaces of said ends which are opposite said joint element, to define between them an annulus extending around the tank, and
   (e) substantially filling said annulus with synthetic bonding resin, thus joining said tank sections with each other and with said joint element.

2. The invention as claimed in claim 1, in which said method further comprises employing as said joint element a continuous cylindrical fiberglass-reinforced synthetic resin hoop which has been factory-manufactured with no joint therein, said hoop having a sufficiently large diameter and a sufficiently thin wall to permit it to be greatly oblated for shipment prior to making of the joint.

3. The invention as claimed in claim 1, in which said method further comprises employing as said joint element a fiberglass-reinforced corrosion-resistant synthetic resin strip which is sufficiently thin to be made into a roll for shipment, said strip having been formed on a mold and thus being a primary laminate, and in which said method further comprises providing said strip on the interior of the tank with the mold-formed surface facing inwardly.

4. The invention as claimed in claim 1, in which said method further comprises making an additional fiberglass-reinforced sealing connection between said ends on the side of said ends remote from said joint element.

5. The invention as claimed in claim 1, in which said joint is made while the axes of said sections are vertical.

6. A method of making a circumferential joint in a large-diameter cylindrical tank, said method comprising:
   (a) providing two large-diameter cylindrical tank sections each formed of fiberglass-reinforced synthetic resin,
   (b) disposing said sections in vertical positions, in axial alignment with each other and with their ends abutting each other,
   (c) providing a short cylindrical joint ring, formed of fiberglass-reinforced synthetic resin, exteriorly around said sections in straddling relationship to the abutted ends,
   (d) sealing the upper edge of said joint ring to the upper tank section,
   (e) sealing the lower edge of said joint ring to the lower tank section,
      the inner diameter of said joint ring, and the manner of performance of said sealing steps, being such that there is a continuous sealed annulus defined within said joint ring exteriorly of the abutted ends of said sections, and
   (f) providing synthetic bonding resin in said annulus to thus join said ends to each other and to said joint ring.

7. The invention as claimed in claim 6, in which said sealing steps (d) and (e) are performed by providing a synthetic resin bonding substance, of the general consistency of putty, respectively between said upper and lower edges and the adjacent wall regions of the tank sections.

8. The invention as claimed in claim 6, in which said method is performed with a joint ring the interior diameter of which is sufficiently greater than the exterior diameters of the ends of said sections to prevent substantial binding upon axial movement of said ring relative to said ends.

9. The invention as claimed in claim 6, in which said step (f) is performed by injecting said synthetic bonding resin into said annulus at one point about the circumference thereof, and venting air from said annulus at a point diametrically opposite said one point.

10. The invention as claimed in claim 6, in which said sections have diameters in the range of about 8 feet to about 60 feet.

11. The invention as claimed in claim 6, in which said joint ring is a continuous cylindrical fiberglass-reinforced synthetic resin hoop which has been factory-manufactured with no joint therein, said hoop having a sufficiently thin wall to permit it to be greatly oblated for shipment prior to the making of the joint.

12. The invention as claimed in claim 6, in which corrosion-resistant fiberglass-reinforced synthetic resin joint means are provided on the interior of said tank in straddling relationship to said abutted ends.

13. The invention as claimed in claim 6, in which said method further comprises mounting said joint ring temporarily on one of said sections and circumferentially therearound, then moving said one section into said position in end abutment with the other section, and then shifting said ring to said straddling relationship.

14. A method of making a corrosion-resistant sealed joint between two large-diameter tank sections, which method comprises:
   (a) disposing in axial alignment and endwise abutment two large-diameter cylindrical tank sections formed of fiberglass and synthetic bonding resin, each such section having a corrosion barrier layer on the interior surface thereof, (b) mounting interiorly adjacent the abutted ends of said sections, and in straddling relationship thereto, a corrosion-resistant fiberglass-reinforced synthetic resin joint element having outwardly-directed flanges, said mounting being such that the edges of said flanges substantially abut said corrosion barrier layers of said sections, thus forming an annulus interiorly adjacent said abutted ends, and (c) introducing synthetic bonding resin into said annulus to substantially fill the same.

15. The invention as claimed in claim 14, in which said joint element is a unitary corrosion-resistant primary laminate the mold-formed side of which faces inwardly toward the center of the tank.

16. A method of making a circumferential joint in a large-diameter cylindrical tank, said method comprising:

(a) providing two large-diameter cylindrical tank sections each formed of fiberglass-reinforced synthetic resin, each section having a wall sufficiently thin that the section may be greatly oblated without exceeding its elastic limit, thus permitting the sections to be shipped from the factory to the erection site, (b) disposing said sections in vertical positions, in axial alignment with each other and with their ends abutting each other, (c) providing a short cylindrical joint ring formed of fiberglass-reinforced synthetic bonding resin, exteriorly around said sections in straddling relationship to the abutted ends, (d) sealing and joining the upper edge of said joint ring to the upper tank section, (e) sealing and joining the lower edge of said joint ring to the lower tank section, the inner diameter of said joint ring, and the manner of performance of said sealing and joining steps, being such that there is a continuous sealed annulus defined within said joint ring exteriorly of the abutted ends of said sections, (f) providing synthetic bonding resin in said annulus to thus join said ends to each other and to said joint ring, (g) mounting interiorly adjacent the abutted ends of said sections and in straddling relationship thereto, a fiberglass-reinforced corrosion-resistant synthetic resin joint element having outwardly-directed flanges, said mounting being such that the edges of said flanges substantially abut said corrosion barrier layers of said sections, thus forming an annulus interiorly adjacent said abutted ends, and (h) introducing synthetic bonding resin into said last-mentioned annulus to substantially fill the same.

17. In a method of achieving the relatively rapid erection of a large-diameter fiberglass-reinforced synthetic resin tank in the field, the steps of:

(a) temporarily mounting a joint ring on one large-diameter fiberglass-reinforced synthetic resin cylindrical tank section, exteriorly thereof and concentrically therearound at a region above the lower edge thereof, (b) lifting said one section, with said joint ring thereon, and setting said one section onto another and similar tank section, coaxially therewith and with the lower end of said one section abutting the upper end of said other, (c) providing stop means to stop downward movement of said joint ring after it has dropped into a predetermined straddling relationship with the abutted section ends, (d) demounting said ring from said one section and causing said ring to drop to said predetermined straddling relationship, and (e) filling with synthetic bonding resin the space defined within said ring exteriorly of said abutted ends.

18. The invention as claimed in claim 17, in which said method further comprises the step of presealing said ends to each other.

19. The invention as claimed in claim 17, in which said ring is a cylinder the interior diameter of which is substantially larger than the exterior diameters of said sections.

* * * * *